United States Patent [19]

Stewart et al.

[11] Patent Number: 4,684,512

[45] Date of Patent: Aug. 4, 1987

[54] PHOSPHATE RECOVERY FROM WET PHOSPHORIC ACID PURIFICATION PROCESS

[75] Inventors: John M. Stewart, Franklin; Teddy R. Clark, Madison; Thomas E. Edging, Nashville, all of Tenn.

[73] Assignee: Stauffer Chemical Company, Westport, Conn.

[21] Appl. No.: 900,192

[22] Filed: Aug. 25, 1986

[51] Int. Cl.$^4$ .............................................. C01B 25/16
[52] U.S. Cl. ................................ 423/321 R; 423/158; 423/317; 423/320; 210/772
[58] Field of Search ............... 423/305, 307, 308, 309, 423/311, 316, 317, 320, 321 R, 158; 210/772

[56] References Cited

U.S. PATENT DOCUMENTS

| | | | |
|---|---|---|---|
| 3,650,686 | 3/1972 | Hudson et al. | 423/309 |
| 4,235,854 | 11/1980 | Smith et al. | 423/320 |
| 4,592,901 | 6/1986 | Smith et al. | 423/320 |

*Primary Examiner*—Gregory A. Heller
*Attorney, Agent, or Firm*—Vivienne T. White

[57] ABSTRACT

The invention is a process for recovering phosphorus value from magnesium pyrophosphate containing filter media in the wet superphosphoric acid purification process. The invention comprises treating the filter cake with a salt to remove the adhering phosphoric acid without solubilizing magnesium acid pyrophosphate. The filter cake, after phosphoric acid removal, can be utilized as commercial or technical grade magnesium acid pyrophosphate.

7 Claims, No Drawings

PHOSPHATE RECOVERY FROM WET PHOSPHORIC ACID PURIFICATION PROCESS

BACKGROUND OF THE INVENTION

1. Field of the Invention

The invention is directed to a method of recovering valuable phosphoric acid from residues generated during the purification of wet process phosphoric acid. The invention is specifically directed to the recovery of phosphoric acid from a magnesium acid pyrophosphate filter cake.

2. Related Art

U.S. Pat. No. 4,443,421 to Hollifield et al. discloses a process for removing particulate impurities from aqueous phosphoric acid. In the process disclosed by Hollifield et al., after filtering the phosphoric acid as described in the reference, the filter cake can be contacted with a wash fluid, as for instance water, to remove entrained phosphoric acid from the filter cake.

U.S. Pat. No. 4,409,194 to Petersen discloses a process for separating magnesium from wet process superphosphoric acid by filtration. This patent is incorporated herein by reference.

Wet process phosphoric acid is conventionally prepared by reacting sulfuric acid and phosphate rock, followed by filtration to remove insoluble gypsum and other insoluble compounds. The resulting dilute, weak phosphoric acid containing about 26–30% $P_2O_5$ by weight, is commonly known as "filter acid" and is a highly impure material containing the dissolved sulfates, fluorosilicates, and salts of iron, aluminum, magnesium, sodium and other metals. These impurities may precipitate and settle out in varying rates and amounts during storage or further processing of the dilute wet phosphoric acid.

Concentrations of weak, wet-process phosphoric acid up to the superphosphate range (containing 64–72% $P_2O_5$) is done in two steps. Preferably, this two-step concentration is done in separate equipment because of variations in temperature, corrosion and viscosity that occur over the total range. As a first step, it is common to evaporate a dilute or weak acid and to partially purify the acid by removal of precipitated impurities consisting of $CaSO_4$, $Na_2SiF_6$, $(Fe,Al)_3KH_{14}(PO_4)_8 \cdot 4H_2O$, and other salts to a concentration of about 38 to about 56 weight percent $P_2O_5$. This acid is known as "evaporator" acid, with about 54% $P_2O_5$ being a most common strength.

As a second step, the partially purified evaporated acid (38–56 weight percent $P_2O_5$) is further evaporated to superphosphoric acid containing about 64–72 weight percent $P_2O_5$. Impurities that precipitate in the production of the superphosphoric acid consist of $MgH_2P_2O_7$, $FeH_2P_3O_{10}$, $AlH_2P_3O_{10}$ and other salts.

Liquid ammonium phosphate fertilizer solutions are derived from purified wet process superphosphoric acid. Said solutions, commonly 10-34-0 grade (10 weight percent N, 34 weight percent $P_2O_5$ and 0 weight percent $K_2O$), and other variations, are prepared either (1) by reacting superphosphoric acid containing 64%–72% $P_2O_5$ with liquid and/or gaseous ammonia or (2) by reacting acid containing 54 to 60 weight percent $P_2O_5$ with gaseous ammonia.

U.S. Pat. No. 4,409,194 discloses a process for removing magnesium impurities from the wet process acid. The process disclosed is to culture and precipitate magnesium from wet process superphosphoric acid in the form of singular, well-defined crystals, as well as some agglomerates. That process comprised aging wet process superphosphoric acid containing 62%–72% by weight of $P_2O_5$ with about 10%–45% of the $P_2O_5$ in the polyphosphate form, from about 4 to 80 hours with intermittent or no agitation. Thereafter, the aged acid from which magnesium has crystallized in the form of $MgH_2P_2O_7$ is filtered to remove the acid therefrom. In this filtration process, as well as in the filtration process associated with removing magnesium impurities from wet process acid, a significant quantity of free phosphoric acid is retained in the filter cake.

It is an object of the instant invention to provide a means for recovering the free phosphoric acid. It is also an object of the invention to provide a magnesium polyphosphate product suitable for use as a fertilizer or for other purposes. In addition, it is a further object of the invention to recover the free acid in a form suitable for use as a fertilizer or industrial chemical feed stock.

SUMMARY OF THE INVENTION

The invention comprises a process for recovering phosphoric acid from the wet process superphosphoric acid filtration media through suspension of the filter media in a sufficient salt solution to solubilize the free phosphoric acid contained therein, then recovering the free acid from the filter cake.

DETAILED DESCRIPTION OF THE INVENTION

The invention is directed to a process for recovery of phosphoric acid from the filter cake derived from the purification of superphosphoric acid derived from the wet phosphoric acid process.

The filter cake treated in a manner as disclosed herein, can be any filter cake obtained in a process of purifying wet process superphosphoric acid to remove therefrom impurities comprising magnesium, iron, aluminum, and the like. In the process of the invention, wet process phosphoric acid is concentrated to about 70% $P_2O_5$, and magnesium acid pyrophosphate is crystallized out of the solution. During the filtration process to remove this magnesium salt, a significant quantity of free phosphoric acid is retained in the filter cake.

The present invention answers the need to separate the liquid superphosphoric acid, adhering to the crystal surface of the magnesium acid pyrophosphate crystals, from the crystals. In the instant invention. the magnesium acid pyrophosphate is maintained in a crystalline state while substantially removing the adhering superphosphoric acid.

The phosphoric acid is recovered as a usable alkali metal or ammonium salt by suspending the phosphoric acid-containing wet filter cake in the alkali metal or ammonium salt solution with subsequent filtration and rinsing with the suspension solution. The alkali metal or ammonium salt used in the process of the invention removes the phosphoric acid but does not solubilize the magnesium acid pyrophosphate. The filter cake, after phosphoric acid removal and drying, is generally a grayish-white free-flowing powder which can be utilized as commercial or technical grade magnesium acid pyrophosphate. The filtrate solution comprising the alkali metal phosphate or ammonium phosphate solution can be utilized as an intermediate in chemical or fertilizer manufacture.

Alkali metal salt suitable for use in the present invention can comprise sodium hydroxide, sodium carbonate, or its hydrates sodium bicarbonate, potassium hydroxide, potassium carbonate or potassium bicarbonate.

Suitable ammonium salts for use in practicing the invention comprise aqua ammonia or ammonium hydroxide. The amount of the alkali metal hydroxide, carbonate, and bicarbonate or ammonium salt which can be utilized in the practice of the invention is limited only by economic and/or process constraints. Generally, the concentration of alkali metal or ammonium salt used are at least stoichiometric, but the desirable range is from about 1.5 to about 4.0 times the equivalent amount of the superphosphoric acid present in the filter media. Amounts in excess of about 4.0 times would be uneconomical and would probably require neutralization of the alkali metal or ammonium phosphate solution to render it suitable for further use. Sufficient amounts of the alkali metal or ammonium salt is required to react with the superphosphoric acid adhering to the cake crystal surface so as to lower the pH sufficiently to suppress the solubility of the magnesium acid pyrophosphate crystals. The alkali metal or ammonium salt reacts with the phosphoric acid to form phosphate salts, water and/or carbon dioxide when carbonate or bicarbonate-containing solutions are used.

The following Examples comprise embodiments of the invention and are not intended to limit the scope of the invention claimed.

EXAMPLE 1

10 grams of wet filter cake (superphosphoric acid mother liquor/magnesium acid pyrophosphate mixture) was slurried with 100 ml of 20% $NH_4OH$ solution for 10 minutes and then filtered. On a stoichiometric basis, about 2.4 grams of $NH_3$ would be required to react with and neutralize the superphosphoric acid fraction to diammonium phosphate. A four-fold excess was used to determine its effect on the solubility of the magnesium acid pyrophosphate crYstal in a warm, alkaline solution.

The filtered crystal and filter paper were then slurried again in a second 100 ml of 20% $NH_4OH$ solution and filtered a second time to remove the remainder of the acid phosphate and determine if there was noticeable hydrolysis of the filter cake solids. The resultant crystalline cake Was dried to remove surface water and to determine the magnesium acid pyrophosphate cake portion on a weight basis.

The components involved in this experiment were:

| Wet Filter Cake | Superphosphoric Acid (Clear Filtrate Acid) | Dry, Washed Cake |
| --- | --- | --- |
| 71.41% $P_2O_5$ | 73.31% $P_2O_5$ | 69.06% $P_2O_5$ |
| 5.93% MgO | 0.31% MgO | 20.21% MgO |

10 gm Wet Filter Cake + 95.3 gm $NH_4OH \rightarrow$ Wash A + Filter Cake A

Filter Cake A + 95.3 gm $NH_4OH \rightarrow$ Wash B + 3.15 gm Cake B (dried)

The resultant wash solutions had an analysis of:

| Wash A | 4.70% $P_2O_5$ | 46 ppm MgO |
| --- | --- | --- |
| Wash B | 0.78% $P_2O_5$ | 8.9 ppm MgO |

A material balance based upon these analyses checks out fairly closely. The adhering superphosphoric acid taken into the wash solution should have contributed 182 ppm MgO to Wash A and 31 ppm MgO to Wash B. However, the analytical results shown above indicate that a magnesium oxide or hydroxide had to be formed and filtered as a precipitate with the filter cake. During the washing periods, it was noted that a cloudy, fine material existed in the solution but it was removed by the solids to give a clear filtrate each time. It should be noted that the theoretical analysis of magnesium acid pyrophosphate ($MgH_2P_2O_7$) is 70.19% $P_2O_5$ and 20.10% MgO. The cake obtained in this experiment was a very pure form of this material.

EXAMPLE 2

A second experiment was performed using the same wet filter cake as in Example 1, with the exception that soda ash (sodium carbonate. $Na_2CO_3.10H_2O$) was substituted for ammonium hydroxide. In this experiment, 10 gm of wet filter cake was slurried with 100 ml of solution containing 22.5 gm $Na_2CO_3.10H_2O$ for about 10 minutes and then filtered. On a stoichiometric basis, about 15 gm of $Na_2CO_3.10H_2O$ would be required to react with and neutralize the superphosphoric acid fraction to a disodium phosphate. Therefore, a 1.5 fold excess was used to determine its effect on the solubility of the magnesium acid pyrophosphate crystal. The decrease in the stoichiometric quantity would also indicate a change in the chemistry if the resultant MgO level in the wash solutions increased significantly.

10 gm Wet Filter Cake + 120 gm $Na_2CO_3$ Soln. $\rightarrow$ Wash Cake A + Filter Cake A Filter Cake A + 152 gm $Na_2CO_3$ Soln. $\rightarrow$ Wash B + Cake B (dried)

Wash A was noticeably cloudy but the filtrate was clear. Similarly, Wash B had a slight haze which was separated from the solids and found to have MgO and silica.

| Wash A / Wash B | 2.87% $P_2O_5$ | 97.1 ppm MgO |
| --- | --- | --- |

EXAMPLE 3

Additional testing was performed on filter cake obtained from treating superphosphoric acid derived from other phosphate rock sources to determine that this process would be equally effective. In this experimental run, the concentration of soda ash in the wash solution was varied to determine the stoichiometric effect on the resultant MgO level obtained in the wash solutions.

| Raw Cake | Superphosphoric Acid (Clear Filtrate) | Dry, Washed Cake |
| --- | --- | --- |
| 68.09% $P_2O_5$ | 70.91% $P_2O_5$ | 69.06% $P_2O_5$ |
| 6.63% MgO | 0.26% MgO | 20.21% MgO |

10 grams of cake were slurried in 5.1 grams $Na_2CO_3.10H_2O$/100 ml $H_2O$ (Wash A) and repeated with the same for second wash (Wash B). This was at 0.35 times the stoichiometric level required.

| Wash A | 2,300 ppm MgO |
| --- | --- |
| Wash B | 618 ppm MgO |

| -continued | |
|---|---|
| Dry Cake | 3.27 gm |

EXAMPLE 4

The experiment in Example 3 was repeated using 0.8 times stoichiometric amounts of $Na_2CO_3$, and the wash was essentially neutral. The wash solution showed a fivefold reduction in MgO level indicating a much lower hydrolysis of the $MgH_2P_2O_7$ than in Example 3.

The adhering, purified superphosphoric acid retained in the wet filter cake represents 48 to 75% of the $P_2O_5$ loss encountered in the magnesium removal process. By treating this wet filter cake in a countercurrent, ammonium or alkali metal solution of equivalent excess, the purified $P_2O_5$ in acid form can be separated and recovered from the $MgH_2P_2O_7$ crystal. This can be done using ammonium hydroxide, sodium carbonate, sodium bicarbonate, or equivalent potassium salt solutions.

The results obtained with this process will reduce the total $P_2O_5$ losses encountered in the magnesium removal process to a 7 to 15% $P_2O_5$ level, the composition level of the pure magnesium acid pyrophosphate initially crystallized. The resultant solutions may be used as a raw material feed into processes manufacturing fertilizer, detergent base sodium salts, etc., to make full use of the separation.

What is claimed is:

1. A process for recovering phosphorus values adhering to the magnesium acid pyrophosphate crystals from wet process superphosphoric acid filtration media comprising suspending the filter media in a sufficient amount of an alkali metal or ammonium salt solution to solubilize free phosphoric acid contained therein and recovering the free acid from the filter cake.

2. The process of claim 1 wherein the alkali metal salt is chosen from the group consisting of carbonates, bicarbonates or hydroxides.

3. The process of claim 2 wherein the alkali metal salt is sodium hydroxide.

4. The process of claim 2 wherein the alkali metal salt is sodium carbonate or its hydrates.

5. The process of claim 1 wherein the ammonium salt is ammonium hydroxide.

6. The process of claim 1 wherein the magnesium acid pYrophosphate crystals, after removal of the acid phosphate, are recovered.

7. The process of claim 1 wherein the salt solution is used in an amount of from 1.5 to 4.0 times the equivalent amount of the superphosphoric acid present.

* * * * *

UNITED STATES PATENT AND TRADEMARK OFFICE
CERTIFICATE OF CORRECTION

PATENT NO. : 4,684,512

DATED : August 4, 1987

INVENTOR(S) : John M. Stewart et al.

It is certified that error appears in the above—identified patent and that said Letters Patent is hereby corrected as shown below:

Col. 2, line 5, "80 hours" should be --180 hours--;

Col. 2, line 44, "magnesIum" should be --magnesium--;

Col. 2, line 54, "metaI" should be --metal--;

Col. 3, line 3, insert a comma (,) after "its hydrates";

Col. 3, line 39, "crYstal" should be --crystal--;

Col. 3, line 47, "Was" should be --was--;

Col. 4, line 18, delete the period (.) after "carbonate" and insert a comma (,).

Signed and Sealed this

Fifth Day of January, 1988

Attest:

DONALD J. QUIGG

Attesting Officer

Commissioner of Patents and Trademarks